Patented Nov. 22, 1932

1,888,219

UNITED STATES PATENT OFFICE

HUGH HARLEY CANNON, OF LOS ANGELES, CALIFORNIA, ASSIGNOR TO CANNON-PRUTZMAN TREATING PROCESSES, LTD., OF LOS ANGELES, CALIFORNIA, A CORPORATION OF CALIFORNIA

METHOD OF FORMING SWEETENING REAGENT

No Drawing.   Application filed September 24, 1930.  Serial No. 484,129.

An object of my invention is to produce a comminuted solid reagent for the sweetening of sour gasoline by a simpler, cheaper and more expeditious method than has heretofore been proposed.

An object of my invention is to produce such a reagent at substantially the instant at which it is used, thus avoiding the cost of storage and any depreciation of the reagent prior to use.

An object of my invention is to produce such a reagent in a finer state of subdivision than has heretofore been possible, preventing any tendency to lump or ball and materially increasing the final efficiency of the reagent.

In two co-pending applications filed by H. H. Cannon and W. W. Gary on January 21, 1929, Serial Nos. 334,003 and 334,004, a reagent for sweetening petroleum products containing mercaptans is disclosed, this reagent consisting of calcium hydroxid and lead monoxid, with or without the addition of diatomaceous or other porous earth.

In these applications it is disclosed that the reagent is prepared by mixing the ingredients with water and thereafter removing so much of the water as will permit the residue to be reduced to the form of an incoherent and substantially dry powder.

In a co-pending application filed by H. H. Cannon on July 8, 1929, under Serial No. 376,516, I disclose a method of sweetening gasoline containing mercaptans by treating it with a solid powdered reagent consisting substantially of calcium hydroxid and lead monoxid with the addition of a small quantity of sodium hydroxid in aqueous solution, diatomaceous or other porous earth or non-reactive clay being optionally added to distend the mass and enable the minute grains of the reagent to come into better contact with the oil to be sweetened.

In the method of sweetening proposed in the last named application the reagent is prepared in advance by mixing the materials and reducing the mixture to an incoherent powder, this powder being thereafter applied as such to the oil. The preferred method of mixing disclosed in application Serial No. 376,516, is to dissolve in water 3 parts by weight of commercial sodium hydroxid, using a quantity of water equal to 34 parts by weight (less the quantity of water carried by other ingredients), to stir into this solution 25 parts by weight of calcium hydroxid, producing a thin cream, to stir into this mixture 16 parts by weight of lead monoxid, producing a thick cream, and finally to mix with this cream 22 parts by weight of diatomaceous earth in fine powder, the final product being a somewhat damp and slightly coherent powder. It will be understood that these proportions were optional and subject to wide variation.

I have discovered that the methods of treatment involving advance preparation of the reagent have serious drawbacks. First, in the drying an aqueous suspension of the materials as in Serial No. 334,003 and Serial No. 334,004, or in adding the earth to the creamy mixture of reactive materials as in Serial No. 376,516, the mixture passes through a stage when it becomes quite sticky and forms balls and masses which are broken down only with difficulty and after long continued stirring or pugging. This adds a serious burden of manufacturing cost to the cost of the materials themselves, and the powdered reagent has finally to be packaged and transported to the point of use. Second, on adding this powder to the oil to be treated it has a tendency to form small pellets of powder surrounded by a wetted layer and thus to resist diffusion through the oil unless extraordinary measures toward such diffusion are taken. Third and by far the most important, the reagent so prepared is not stable, as was at first believed, but depreciates rapidly in sweetening power on standing—to such an extent that a very appreciable reduction in power is noticed within twenty-four hours. This depreciation is believed to be due to the formation of an inactive calcium silicate, but whatever be the reason, the sweetening power of the reagent is often reduced to one-third its original value within a few days.

I have further discovered that a highly effective reagent may be prepared by blending the materials in suspension in a small quantity of the oil to be treated instead of in an aqueous suspension. By proceeding in this manner the cost of blending, packaging and transporting the reagent is practically eliminated, it costing no more to transport the separate materials to the point of use than to transport them to the mill. The blend produced in this manner is very finely subdivided in the oil and shows no tendency to ball at any stage in the blending or the following treatment of the oil. And finally, the blend is made so rapidly and simply that it may be made as required, thus avoiding any possibility of depreciation.

In preparing the reagent in the manner of my present invention I practically reverse the former order. I first place in any form of agitating vessel—preferably one provided with a centrifugal circulating pump—a relatively small quantity of the oil to be treated or of an oil which may be mixed with the treated stock without harming it. To this oil I slowly add the required quantity of diatomaceous earth in fine powder, meanwhile agitating or circulating until the powder is thoroughly diffused to form a smooth cream or slurry. Continuing the agitation I next add the required proportion of lime and then the required proportion of lead oxid, agitating each until it is thoroughly diffused and suspended.

Finally I add the proportion of water required to produce combination of the lead with the lime, if the reagent disclosed in Serial No. 334,003 is desired, or the required proportion of sodium hydroxid in the form of a solution in the required amount of water if the reagent disclosed in Serial No. 376,516 is to be produced.

This water or solution should be fed in a thin stream unless the agitation is very violent and, probably by reason of the presence of the large volume of diatomaceous earth, is rapidly absorbed into the suspended powder, which takes it up completely without lumping and without leaving even a cloud of water in the suspending oil.

The slurry thus produced should be of a thickness which can be pumped, and may be transferred immediately to the vessel or apparatus in which it is to be applied to sweeten further quantities of oil. Or if more convenient a supply sufficient for 24 to 48 hours operation may be prepared at once and drawn on as needed, the depreciation of the reagent when thus suspended in oil being very slow if, indeed, there is any depreciation at all.

The reagent thus produced is, so far as I know, identical with that produced from the same materials, by the processes disclosed in the co-pending applications. The instant invention is, therefore, not of a reagent but of a method of preparing it for use; an improved method of bringing the component materials into reactive and usable form.

As said, the preferred method of mixing is to first suspend the earth, which is very bulky and increases the suspending power of the oily vehicle for the heavier reagent materials; to these add the lime and the lead, in either order, and last to add the water or the alkali solution as the case may be. This method of mixing is preferred, not because of any superior qualities thus imparted to the reagent, but solely because it is accomplished with the least time and agitation.

It is entirely permissible to add the solid powdered ingredients (lead and lime or lead, lime and earth) in any other order, or to previously intermix them in the dry form, or to dump them into the agitating vessel as they are separately weighed out.

It is also permissible, though I do not recommend the practice, to first add the water or caustic solution to the oil and thereafter to add the powdered ingredients, but in such case the aqueous ingredient must be most thoroughly diffused throughout the oil before any dry material is added, and even with this precaution balling of the reagent is likely to result.

It is not permissible to mix the aqueous ingredient with the solid ingredients before adding them to the oil, as in such case the dry materials would stick together and all the advantages of my present invention would be lost. It should be said, however, that the intermixture of a small proportion of any of the solid ingredients with the aqueous constituent, leaving the latter in a completely fluid condition, would be harmless and would be a mere evasion of my present invention.

I claim as my invention:

1. The method of preparing a sweetening reagent comprising litharge, an alkali earth hydroxid and an absorbent earth, all in solid comminuted form, together with an aqueous constituent, which comprises: intimately intermingling said constituents in suspension in the minimum quantity of an oily vehicle, said quantity being materially less than the quantity of oil to be treated by said reagent.

2. The method of preparing a sweetening reagent comprising litharge, an alkali earth hydroxid and an absorbent earth, all in comminuted form, together with an aqueous constituent, which consists in intimately intermingling the solid constituents in an oily vehicle and in intimately intermingling the aqueous constituent with the solid constituents in the same vehicle.

3. The method of preparing a sweetening reagent which comprises: intimately commingling in an oily vehicle solid comminuted litharge, an alkali earth hydroxid and an absorbent earth and in thereafter intimately commingling with said mixture an aqueous constituent.

4. The method of preparing a sweetening reagent which comprises: intimately commingling in an oily vehicle solid comminuted litharge, an alkali earth hydroxid and an absorbent earth, adding water to said mixture and producing an intimate intermixture of said water with said mixture.

5. The method of preparing a sweetening reagent which comprises: intimately commingling in an oily vehicle solid powders of litharge, an alkali earth hydroxid and an absorbent earth, adding to said mixture an aqueous solution of an alkali metal hydroxid, and producing an intimate intermixture of said solution with first said mixture.

In witness that I claim the foregoing I have hereunto subscribed my name this 27th day of August, 1930.

HUGH HARLEY CANNON.